United States Patent Office

3,540,126
Patented Nov. 17, 1970

3,540,126
FLUOROALKOXYALKYL 2 - CYANOACRYLATE
COMPOSITIONS USED IN TOOTH TREATMENT
Robert W. H. Chang, St. Paul, Elden H. Banitt, Woodbury, and Richard W. Joos, Minneapolis, Minn., assignors to Minnesota Mining and Manufacturing Company, St. Paul, Minn., a corporation of Delaware
No Drawing. Filed July 16, 1968, Ser. No. 745,099
Int. Cl. A61k *5/02;* C08f *3/62;* C09k *3/00*
U.S. Cl. 32—15                                    10 Claims

ABSTRACT OF THE DISCLOSURE

This invention relates to the process for using a fluoroalkoxyalkyl 2-cyanoacrylate in an adhesive, sealant, and/or coating composition for application to teeth, the resulting treated tooth, and compositions useful in said process.

---

This invention relates to the use of compositions including fluoroalkoxyalkyl 2-cyanoacrylates which polymerize rapidly to form adhesives, coatings and sealants in the art of dentistry. More particularly the invention is concerned with dental practices including the bonding of appliances to teeth, endodontic filling employing restorative materials, the lining of cavity preparation before placing of the restoration, the coating of restoratives after finishing, and the preventive coating of caries-susceptible areas on teeth.

The dental adhesive and sealant compositions presently known and employed in the orthodontic, prosthodontic and endodontic areas of dentistry have presented several problems of which perhaps the cost troublesome has been their inability to withstand the degradation activity of oral fluids. Often the compositions employed require prior detrimental etching of the teeth to effect adhesion and are degraded by oral fluids subsequent to application, thus providing a site at the adhesive interface for caries development. See, e.g., Skinner, et al., Science of Dental Materials, 6th ed., chap. 29 (1967). In addition to their susceptibility to attack by oral fluids, many adhesive and sealant compositions presently in use exhibit detrimental effects (e.g., etching) on enamel and a toxic interaction with pulp. Furthermore, they are often bothersome to prepare and difficult to apply.

Thus, for example, while methyl 2-cyanoacrylate has been suggested as the basic component in dental adhesive and sealant compositions (see, e.g., Gwinnett et al., Brit. Dent. J. 119, 77–80 (1965) and Cueto et al., J. Am. Dent. Assn. 75, 121–128 (1967) several problems are encountered in connection with its use. Chief among these problems are its susceptibility to degradation by oral moisture and its rapid rate of polymerization, making application difficult. Furthermore, there is evidence that methyl 2-cyanoacrylate exhibits an undesirable degree of histotoxicity, see, e.g., Arch Surg. 94, 153–156 (1967) and J. Biomed. Mater. Res. 1, 3–9 (1967).

Accordingly, it is an object of the invention to provide a dental adhesive, coating and sealant composition which is highly resistant to degradation by oral moisture, which is minimally injurious to the enamel or pulp of teeth, which polymerizes to form very strong bonds with teeth and dental materials in the oral environment and which polymerizes at a rate which is conducive to ease in handling and application.

A further object is to provide a tooth surface having an improved dental adhesive coating and/or sealant composition bonded thereto and to provide a method for the preparation thereof.

Other objects, advantages and features of the invention as well as the manner of practicing the same will become more apparent from the following detailed description.

In attaining the above noted objects, the practice of the invention comprises applying to a tooth surface a composition comprising as the major adhesive component thereof at least one compound of the structural formula:

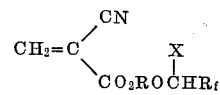

wherein R is a straight or branched divalent aliphatic hydrocarbon radical having from 2 to 8 carbon atoms, preferably 2 to 6 carbon atoms, e.g., an alkylene radical such as ethylene, propylene, trimethylene, 1,2-butylene, 2,3-butylene, tetramethylene and the like; $R_f$ is a straight or branched fluoroaliphatic radical (e.g. a fluoroalkyl radical) having from 1 to 8 carbon atoms, preferably 1 to 5 carbon atoms; and X is R—H, $CH_3$, $R_f$ or H, preferably $R_f$ or H; and curing said compositions thereon. The term "fluoroaliphatic radical" is herein defined to include straight or branched chain, saturated, fluorine substituted aliphatic (including cycloaliphatic) radicals which may contain oxygen atoms in the chain but which contain only hydrogen substituents other than the fluorine. In the preferred compounds, $R_f$ contains fluorine atoms in a ratio of at least one fluorine atom for each carbon atom and has a terminal —$CF_3$ group. While all of the above described compounds are within the scope of the present invention, the most preferred compounds are those wherein $R_f$ is perfluoroalkyl (e.g., trifluoromethyl) and X is H or $R_f$; for example,

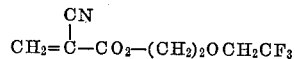

and

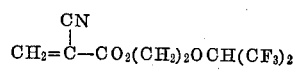

Other illustrative 2-cyanoacrylate compounds useful in the dental compositions of this invention include:

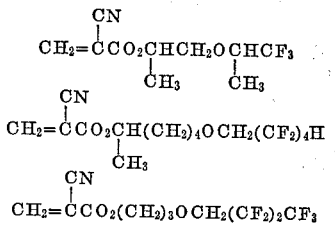

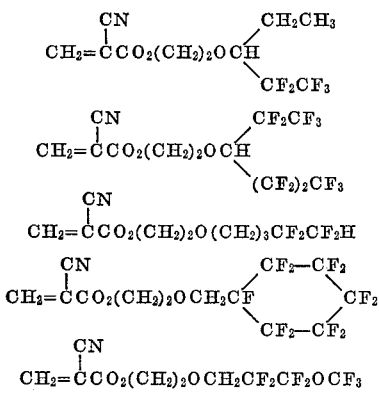

$$CH_2=\overset{CN}{\underset{|}{C}}CO_2(CH_2)_2O\overset{CH_2CH_3}{\underset{CF_2CF_3}{\diagup}}\overset{}{\diagdown}$$

$$CH_2=\overset{CN}{\underset{|}{C}}CO_2(CH_2)_2O\overset{CF_2CF_3}{\underset{(CF_2)_2CF_3}{\diagup}}\overset{}{\diagdown}$$

$$CH_2=\overset{CN}{\underset{|}{C}}CO_2(CH_2)_2O(CH_2)_3CF_2CF_2H$$

$$CH_2=\overset{CN}{\underset{|}{C}}CO_2(CH_2)_2OCH_2C\overset{CF_2-CF_2}{\underset{CF_2-CF_2}{\diagup\diagdown}}CF_2$$

$$CH_2=\overset{CN}{\underset{|}{C}}CO_2(CH_2)_2OCH_2CF_2CF_2OCF_3$$

The invention further contemplates compositions comprising comonomeric mixtures including more than one compound of the invention as well as compositions comprising mixtures of the fluoroalkoxyalkyl 2-cyanoacrylates of the invention in conjunction with minor amounts (i.e., less than 50 mol percent) of other 2-cyanoocrylates which possess acceptable properties, i.e., unsubstituted alkyl and alkoxyalkyl 2-cyanoacrylates as well as fluoroalkyl 2-cyanoacrylates. Specific properties required of an adhesive composition for a particular application may be obtained by selectively varying the type and amount of the comonomeric components.

Adhesive bonds formed by the polymerization of the compounds of the invention exhibit properties which make them highly suitable for use in the oral environment and which overcome the disadvantages of the prior art. Thus, adhesive coatings and/or sealant compositions comprising the fluoroalkoxyalkyl 2-cyanoacrylates are now capable of providing bonds of unusual strength and exceptional resistance to degradation by oral moisture, with no detrimental effect on tooth enamel and minimal toxic interaction with pulp. Furthermore, these compounds cure, i.e., polymerize, at a rate (usually less than 2 minutes, e.g., from 10 to 60 seconds, at normal body temperature) which allows the user sufficient time for application and manipulation in the oral environment before polymerization occurs. The low viscosity of these compounds also adds to the formation of strong bonds with tooth surfaces, since a definite seeping of the liquid monomer into extremely minute pits and fissures is observed.

Polymerization is initiated by weakly basic substances such as atmospheric moisture. Control of the cure rate can be accomplished by varying the amount of additives which may be added to a particular composition, such as inorganic fillers (described below), and 2-cyanoacrylate polymerization inhibitors or stabilizers such as sulfur dioxide, nitric oxide, boron trifluoride and other acidic substances including hydroquinone, monomethly ether hydroquinone, nitrohydroquinone, catechol and monoethyl ether hydroquinone. Conversely, polymerization accelerators such as amines or alcohols, may be added if an increased cure rate is desired. One or more adjuvant substances, such as thickening agents, plasticizers, and the like can also be added to improve the adaptability of the monomer. Obviously, such adjuvant materials as may be selected must be biologically acceptable and should not cause premature polymerization of the adhesive before its intended use.

Thin films of the adhesive are rapidly autopolymerizable under ordinary ambient atmospheric conditions and the compounds of the invention, which are essentially colorless and transparent, are suitable for dental uses without additives, although better stability during storage is obtained when the compounds are stored in bulk with small amounts of 2-cyanoacrylate polymerization inhibitors (approximately 25 to 2000 parts per million). Plasticizers such as 1% dioctylphthalate and antimicrobials such as 1% hexachlorophene may also be included. The viscosity of the composition may be increased if desired by dissolving polymeric materials therein such as 5% polymethylmethacrylate. For certain applications, where, for example, the compounds may be used in a temporary composite restorative material, an inorganic particulate filler such as lithium aluminum silicate, coloring agents or pigments or glass microbeads is desirably included to increase the abrasive resistance and strength of the restorative and to vary the esthetic appearance. The amount of such filler may be varied from 0% to about 80% depending on the consistency required for a particular application. Various additives such as calcium hydroxide or barium sulfate may be added to promote pulpal recovery and provide radiopacity, respectively.

In the fields of prosthetic dentistry adhesive compositions comprising compounds of this invention are advantageously employed as a general dental adhesive. The methods of application are those well known in the dental art, namely; the compound or composition containing the compound is applied to the tooth surface, e.g., directly with a dental instrument or on the particular appliance to be adhered thereto. The appliance is held in place for the time required for sufficient curing to develop adequate adhesion. The adhesive composition bonds rapidly under the conditions in the oral environment. In order to improve adhesion the tooth is preferably polished and/or pretreated by wetting for a few minutes with weakly acidic solution or stannnous fluoride solution.

In the field of restorative dentistry compositions comprising compounds of the invention are particularly useful as a component of temporary composite restorative materials. For example in the treating of extremely deep carious lesions the dentist may desire to fill with a temporary restorative before installing a permanent restorative so as to allow damaged pulp to heal before being exposed to the permanent restorative. In such cases it is essential that the cavity be effectively sealed off from oral fluids and that the temporary restorative material employed be non-irritating to the pulp. The preferred compounds of this invention when filled with approximately 70% silane-coated lithium aluminum silicate, provide a temporary composite restorative material which effects a satisfactory sealing of the cavity. The procedure for installing such a temporary restorative is similar to those used in the dental art to apply resin composite restorative materials, The adhesive compositions of the invention are also well suited for use in endodontic fillers in cases where the dental pulp chamber is cleaned and disinfected before the apex of the tooth is sealed. The requirements for endodontic sealing materials are that they form a lasting seal and be non-toxic to the periapical tissue. Preferably such materials are radiopaque. A composite material consisting essentially of a compound of the invention and about 50% barium sulfate possesses the required properties. In addition, the low viscosity of the monomer and its affinity for tooth materials results in a highly effective penetration of the polymer into voids in the tooth. This provides an effective seal at the apex and at other secondary canals leading from the pulp to surrounding tissue. Such an endodontic filler may be mixed by spatulation or agitation and is placed in a properly prepared canal with a syringe technique.

Because many of the presently available restorative materials either irritate the pulp or permit seepage of oral constituents at the margins between tooth and restorative, it is commonly a recommended procedure that cavity preparations be lined before placing of the restoration. The requirements for such a liner are that it minimize the penetration of harmful ingredients from the restorative to the pulp and seal the restorative margins. Such a liner should further be substantially non-toxic to pulp and easily applied. The resistance of the cured compounds of this invention to penetration of water-soluble substances, including the possibly toxic ingredients in resin restoratives, makes them particularly effective as cavity liners. Apart from their exceptional adhesion to teeth, the fluoroalkoxyalkyl 2-cyanoacrylates of the invention have even better adhesion to widely used commercial restorative materials, such as amalgam, indicating their utility for adhering restorative materials to teeth. Resistance to marginal penetration around class V restorations on human incisors is demonstrated after observation of said treated human incisors by placement in 0.2% aqueous methylene blue for 18 hours at 37° C. Marginal penetration has been found to be substantially less in the case of a liner comprising 2-(2,2,2-trifluoroethoxy)-ethyl 2-cyanoacrylate than with an unlined restorative or with a commercially available liner.

The compositions of the invention are particularly useful in the field of conservative and preventive dentistry, for example in the effective sealing of caries-susceptible pits and fissures present in most posterior human teeth. A highly effective reduction of the incidence of caries is possible by a proper sealing of these surfaces with compositions of the invention. Preferably the teeth are treated topically with stannous fluoride [see e.g. Dudding et al., J. Dent. Child. 29, 129 (1969)] and dried with an air stream before application of the sealant mixture. The usual dental instrument such as a ball applicator or probe is employed. The sealant composition preferably comprises a fluoroalkoxyalkyl 2-cyanoacrylate combined with a filler such as 50% silane-coated lithium aluminum silicate.

Because of the exceptional strength and resistance to degradation of the bonds formed by fluoroalkoxyalkyl 2-cyanoacrylate with composite dental materials, these compounds are highly useful as coatings for dental restoratives which must be either protected from the oral environment or are difficult to polish after finishing. Such a coating with the proper additives, provides protection for the restorative and provides a resinous surface suitable for polishing and which is highly resistant to staining by coffee or tea and the like.

One method of preparing high purity (95% or greater) fluoroalkoxyalkyl 2-cyanoacrylates employed in the practice of the invention involves condensing formaldehyde with an ester of the corresponding cyanoacetic acid in the presence of a mixture of an acid and the acid salt of an alkyl primary or secondary amine. Any salts of an alkyl primary or secondary amine and any free acid may be utilized as the components of the mixture provided they establish the necessary pH value as described in detail below. The resulting 2-cyanoacrylate polymers are then thermally depolymerized to obtain the desired monomers. Thermal depolymerization may be carried out by techniques described in U.S. Pats. 2,784,215; 2,721,858; and 2,763,677 and illustrated in the examples set out below. Specifically, the preparation of the above polymers employs the cyanoacetates corresponding to the desired cyanoacrylates [e.g., 2-(2,2,2-trifluoroethoxy)-ethyl 2-cyanoacetate for the preparation of 2-(2,2,2-trifluoroethoxy)-ethyl 2-cyanoacrylate]. The cyanoacetate ester is reacted with formaldehyde or polymers thereof, as typified by paraformaldehyde. The presence of water should be avoided and therefore aqueous solutions of formaldehyde, such as Formalin, are not useful. The reaction medium may be any suitable inert organic solvent capable of forming an azeotrope with water, such as benzene, toluene, etc. All phases of the synthetic sequence are carried out under acidic conditions. The necessary pH value for the mixture of acid and acid salts of an alkyl primary or secondary amine referred to above may be characterized as a "corrected pH value" of not over pH 5 and may be determined as follows.

The exact amounts of amine acid salt and free acid to be used in the condensation step are disolved in 25 ml. of water, and the pH of the solution is measured. If the resulting pH value is 5 or less, the mixture will adequately catalyze the condensation reaction. When the mixture is soluble in water, this is the "corrected pH value." Mixtures comprising organic acid which are not readily soluble in water may be dissolved in 25 ml. of an ethanol-water mixture; however, the measured pH must then be corrected as described by Gutbezhl et al., J. Am. Chem. Soc. 75, 565 (1953).

Both the amine salt and the free acid are always present. Glacial acetic or strong mineral acid, such as hydrochloric or sulfuric acid are preferred. The amount of mixture employed is not critical and may be varied. Ordinarily a small amount, e.g., 0.5 to 1.0 percent by weight, based on the weight of cyanoacetic ester is adequate.

Except for the use of the amine salt and free acid mixture, a condensation of cyanoacetic esters with formaldehyde and the subsequent depolymerization process are carried out by methods similar to those reported in the literature.

Esters of cyanoacetic acids which are employed in the preparation of the desired fluoroalkoxyalkyl 2-cyanoacrylates are readily preparable by direct esterification of cyanoacetic acid in the presence of an acid, such as sulfuric acid or the like, with alcohols represented by the formula:

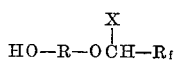

in which R, R$_f$ and X have the values assigned earlier. Said alcohols are known in the art and may be prepared by well known methods, such as the base catalyzed reaction of a fluorine-containing alcohol with an epoxide and the displacement reaction of a fluorine-containing alkoxide with a halo-alcohol wherein the halo atom is chloro, bromo or iodo.

While the above described condensation process for preparing the cyanoacrylates of the invention from the corresponding cyanoacetates is the preferred method, other methods known in the art for the preparation of alkyl 2-cyanoacrylates, such as base catalyzed condensation of formaldehyde or paraformaldehyde, may be employed. See, e.g., U.S. Pats. 2,721,858 and 2,763,677.

The following examples will illustrate the preparation of the compounds used in this invention. It will be understood, however, that the examples are included merely for the purposes of illustration and are not intended to limit the scope of the invention, unless otherwise specifically indicated. All parts are by weight unless otherwise specified, and the pressures are shown in millimeters of mercury.

EXAMPLE A 2-(2,2,2-trifluoroethoxy)-ethanol

A concentrated solution of potassium 2,2,2-trifluoroethoxide is prepared by heating 61.8 g. of potassium hydroxide (1.1 mole) in 150 g. of 2,2,2-trifluoroethanol (1.5 moles) to 90° C. for one hour. 80.5 g. of 2-chloroethanol (1.0 mole) is then added dropwise with good stirring over 3.5 hours at 90° C. The thick, brown mixture is filtered to remove salt, concentrated under vacuum and crudely distilled. Redistillation through the spinning band column provides purified product alcohol, B.P. 84° C./70 mm.; $n_D^{27°} = 1.3545$.

*Analysis.*—Calculated for $C_4H_7F_3O_2$ (percent): C, 33.3; H, 4.9. Found (percent): C, 32.9; H, 4.8.

2-(2,2,2-trifluoroethoxy)-ethyl cyanoacetate

Crude cyanoacetyl chloride prepared from 51.0 g. of cyanoacetic acid (0.6 mole) and 125.0 g. of phosphorus pentachloride (0.6 mole) is treated with 93 g. of 2-(2,2,2-trifluoroethoxy)-ethanol (0.645 mole) introduced in increments over a period of one hour to avoid overheating. The reaction is thereafter forced to completion by heating to 65° C. for two hours. Crude product boiling at 102–108° C./0.1 mm. is distilled directly from the reaction vessel and redistilled through a spinning band column, B.P. 85–86° C./0.1 mm.

*Analysis.*—Calculated for $C_7H_8F_3NO_3$ (percent): C, 39.8; H, 3.8. Found (percent): C, 39.5; H, 3.8.

2-(2,2,2-trifluoroethoxy)-ethyl 2-cyanoacrylate

A mixture of 422.4 g. of 2-(2,2,2-trifluoroethoxy)-ethyl cyanoacetate (2.0 moles), 78 g. of powdered paraformaldehyde (2.6 moles), 2.5 g. of piperidine hydrochloride and 1 ml. of glacial acetic acid in 800 ml. of benzene is heated under reflux until no further water separates. The resulting solution is diluted with 400 ml. of acetone, filtered, combined with 210 g. of tricresylphosphate and concentrated by distillation at reduced pressure. 10 g. of polyphosphoric acid and 0.5 g. of pyrogallol are added to the viscous residue, and depolymerization is effected by heating this mixture under reduced pressure using a good sulfur dioxide bleed into the reaction vessel and rapid mechanical stirring. Crude monomer weighing 310 g. is collected in a Dry Ice-cooled receiver at a bath temperture/system pressure of 185–195° C./0.15 mm. Redistillation from a small amount of phosphorus pentoxide in the presence of sulfur dioxide provides +99 percent pure monomeric product.

EXAMPLE B 2-(1,1-dihydroperfluorobutoxy)-ethanol

A mixture of 200 g. (1.0 mole) 1,1-dihydroperfluorobutanol, 2.0 g. sodium hydroxide and 2 ml. water is placed in a 500 ml. round-bottomed flask equipped with internal thermometer, magnetic stirrer and two Dry Ice condensers. The mixture is stirred and maintained at 50° C. while 35.8 g. (0.8 mole) ethylene oxide is introduced as a gas into the top of one condenser over a period of 1.5 hours. After completion of the addition, the solution is heated under reflux conditions for 4 hours and distilled through a short column. Excess 1,1-dihydroperfluorobutanol is recovered together with a fraction boiling at 80–98° C./85-95 mm. It is composed of 90% product alcohol and 10% starting alcohol and can be used in the subsequent esterification without further purification.

2-(1,1-dihydroperfluorobutoxy)-ethyl cyanoacetate

Cyanoacetic acid (51.1 g., 0.60 mole) is esterified with 119.7 g. (0.81 mole) 2-(1,1-dihydroperfluorobutoxy)-ethanol by heating the two reagents in 300 ml. benzene containing 0.5 g. p-toluene sulfonic acid. When no more water separates in a Dean-Stark trap, the benzene solution is cooled, filtered and concentrated. Distillation of the residue provides the cyanoacetate product, B.P. 91–92° C./0.4 mm.

2-(1,1-dihydroperfluorobutoxy)-ethyl 2-cyanoacrylate

A mixture of 118.0 g. (0.38 mole) 2-(1,1-dihydroperfluorobutoxy)-ethyl cyanoacetate, 15 g. (0.5 mole) powdered paraformaldehyde, 0.5 g. piperidine hydrochloride and 1 ml. glacial acetic acid in 200 ml. benzene is heated under reflux until no additional water separates in a Dean-Stark trap. The resulting solution is cooled, diluted with 200 ml. acetone, filtered, combined with 60 g. tricresylphosphate and concentrated by distillation at reduced pressure. Polyphosphoric acid (1 g.) and pyrogallol (0.5 g.) are added to the viscous residue and depolymerization is effected by heating this mixture under reduced pressure using a good sulfur dioxide bleed and rapid mechanical stirring. Crude product weighing 72.4 g. is collected in a Dry Ice-cooled receiver at a bath temperature/system pressure of 177–194° C./0.6 mm. Redistillation from a small amount (0.5 g.) of phosphorus pentoxide in the presence of sulfur dioxide provides the desired 2-cyanoacrylate product, B.P. 100–103° C./0.8 mm., which is shown by gas-liquid chromatographic analysis to be +99% pure.

EXAMPLE C

A mixture of 277.5 g. (1.62 moles) 2-isopropoxyethyl cyanoacetate (prepared by techniques described earlier), 61.2 g. (2.04 moles) powdered paraformaldehyde, 1.6 g. piperidine hydrochloride and 3 cc. glacial acetic acid in 400 ml. benzene is heated under reflux until no additional water separates in a Dean-Stark trap. The resulting solution is diluted with 400 ml. acetone, filtered, combined with 175 g. tricresylphosphate and concentrated by distillation at reduced pressure. Polyphosphoric acid (6 g.) is added to the viscous residue and depolymerization is effected by heating this mixture under reduced pressure using a good sulfur dioxide bleed and rapid mechanical stirring. Crude product weighing 215 g. is collected in a Dry Ice-cooled receiver at a bath temperature/system pressure of 188–195° C./1.3 mm. Redistillation from a small amount of phosphorus pentoxide in the presence of sulfur dioxide provides a product which is shown by gas-liquid chromatographic analysis to be +98% pure and which is 2-isopropoxyethyl-2-cyanoacrylate.

The following examples will illustrate dental applications employing the fluoroalkoxyalkyl 2-cyanoacrylates of the invention.

EXAMPLE 1

Fluorinated monomers of the invention, unfluorinated alkoxyalkyl 2 - cyanoacrylates and methyl 2 - cyanoacrylate were used to bond a plug of dental restorative material to a polished surface of a bovine incisor and the shear strength required by break the bond was measured. The following procedure was followed in each case.

Bovine incisors were freshly ground with 400 mesh sandpaper, immersed in an 8% $SnF_2$ solution for four minutes, wiped dry, and then wetted with the monomer to be tested. The flat end of a cylindrically shaped plug of composite dental restorative material comprising polymerized, crosslinked, modified acrylate with glass beads imbedded therein and having a surface area of 0.056 square inch was similarly wetted. Both surfaces were allowed to become tacky for four minutes and then joined. Nineteen minutes after initial wetting with monomer the system was submerged in 0.01 M phosphate buffer solution at pH 7.3 and maintained in buffer at 37° C. the shear strength required to break the bond was then measured with an Instron Model TM shear strength tester with a 0.02 inch/minute crosshead speed (the Instron is a testing instrument available from the Instron Engineering Corporation, Canton, Mass.).

The results tabulated below represent an average value of five tests run for each monomer tested.

| Monomer | Shear strength (p.s.i.) | | |
|---|---|---|---|
| | After one day | After 11 days | After 56 days |
| $CH_2=\overset{CN}{\underset{|}{C}}-CO_2(CH_2)_2OCH_2CF_3$ | 1,500 | 630 | 400 |
| $CH_2=\overset{CN}{\underset{|}{C}}CO_2(CH_2)_2OCH_2CH_3$ | 270 | 20 | 0 |
| $CH_2=\overset{CN}{\underset{|}{C}}CO_2(CH_2)_2OCH(CF_3)_2$ | 1,350 | 900 | 900 |
| $CH_2=\overset{CN}{\underset{|}{C}}CO_2(CH_2)_2OCH(CH_3)_2$ | 250 | 20 | 0 |
| $CH_2=\overset{CN}{\underset{|}{C}}CO_2CH_3$ | 1,100 | 360 | 150 |

EXAMPLE 2

Preparation for class V restoration in human teeth were lined in two instances with a composition comprising 2(2,2,2-trifluoroethoxy)-ethyl 2-cyanoacrylate and in two instances with a liner comprising a copolymer of acrylonitrile and vinylidine chloride available under the trade name "Saran" from the Dow Chemical Company, Midland, Mich. The restorations were installed using a composite dental restorative material comprising polymerized, crosslinked, modified acrylate with glass beads imbedded therein. The restored teeth were then placed in a 0.2% aqueous solution of methylene blue which was thermally cycled six times from 2° C. to 65° C. over a period of five minutes per cycle. The solutions with the teeth contained therein were maintained at 37° C. for a period of 20 hours after which the teeth were removed and sectioned through the restoratives and observed for marginal penetration of the dye.

In three cases the preparations were pretreated prior to lining for 4 minutes with an 8% solution of $SnF_2$ and in one of these cases the installed restoration was also coated with 2-(2,2,2-trifluoroethoxy)-ethyl 2-cyanoacrylate. In a fourth case no pretreatment or restoration coating was applied.

The depth of penetration was graded from 0 to +5 according to the procedure reported in J. Am. Dent. Assn., 73, 107 (1966). The results are tabulated below.

| Tooth No. | Liner | Pretreatment | Score |
| --- | --- | --- | --- |
| 1 | "Saran" | None | +5, +5 |
| 2 | do | 8 percent $SnF_2$ | +4, +4 |
| 3 | 2(2,2,2-trifluoroethoxy) ethyl 2-cyanoacrylate. | 8 percent $SnF_2$ | +1, +1 |
| 4 | do | 8 percent $SnF_2$, restoration coated. | 0, 0 |

EXAMPLE 3

Caries-free human molars and bicuspids were cleaned with toothbrush and pumice, rinsed with water and dried with an air jet. A sealant composition comprising one part 2-(2,2,2-trifluoroethoxy)-ethyl 2-cyanoacrylate and one part γ-methacryloxy propyltrimethoxy silane coated lithium aluminum silicate powder was mixed by spatulation and applied to the grooves, pits and fissures on the occlusal surface with a Kerr Cavitec ball applicator. After the composition had cured, the teeth were placed in water and stored at 37° C. for 150 days.

The time in minutes required to remove the sealant with a Darby-Perry type tooth scaler No. 11 was measured. The results indicated that the sealant remained strongly bonded to the tooth surfaces despite prolonged exposure to water. The results tabulated below are averages of three tests run at each day interval.

| Time after sealing, days | Time (minutes) to chip off |
| --- | --- |
| 1 | 5 |
| 14 | 4 |
| 28 | 5 |
| 150 | 1½ |

EXAMPLE 4

Five bovine incisors polished and treated with $SnF_2$ as described in Example 1. 2-(2,2,2-trifluoroethoxy)-ethyl 2-cyanoacrylate was applied to the polished tooth surface with a plastic squeeze bottle. A stainless steel edgewise anterior bracket was then immediately brought into apposition with the tooth at the point of the adhesive and was held in place until the adhesive cured. Four hours after polymerization, the shear strength required to rupture the bond was determined in the manner described in Example 1. The average force required to shear off the bracket was observed to be 700 p.s.i.

EXAMPLE 5

Two similar class V cavity preparations were made in each of three human cuspid teeth. Restorations in said cavity preparations were then overfilled with a composite dental restorative material identical to that employed in Example 1 and polished with a medium garnet disk and then by a fine cuttle disk. Next, one of the restorations in each tooth was coated with a thin film of a composition comprising 2-(2,2,2-trifluoroethoxy)-ethyl 2-cyanoacrylate. The remaining restoration in each tooth was not so coated. The teeth were then placed respectively in individual solutions of strong tea, coffee and 0.2% methylene blue. The solutions were maintained at 37° C. for a period of 48 days, fresh solution being added periodically.

The restorations were observed for staining. After 24 hours, considerable staining was observed on the non-coated restoration immersed in methylene blue. After 48 days, each of the uncoated restorations was noticeably stained, primarily at the margins. No staining was observed on the coated restorations.

EXAMPLE 6

Human molars which had been pretreated for four minutes in an 8% solution of $SnF_2$ and coated with 2-(2,2,2-trifluoroethoxy)-ethyl 2-cyanoacrylate stabilized with about 100 parts per million sulfur dioxide were immersed in water and maintained therein at 37° C. for a period of six months. The teeth were then removed, dried and the coating was observed to be intact and free of degradation.

EXAMPLE 7

Preparations in two teeth were filled with a temporary dental restorative composition comprising 70% lithium aluminum silicate powder treated with γ-methacryloxy propyltrimethoxy silane and 30% 2-(2,2,2-trifluoroethoxy)-ethyl 2-cyanoacrylate and stabilized with 200 parts per million sulfur dioxide and 15 parts per million monomethyl ether of hydroquinone. The filled teeth then immersed in water at 37° C. for two months. The fillings were then removed, probed strenuously with a stainless steel dental explorer. The fillings were observed as not having been weakened or deteriorated.

EXAMPLE 8

Five cylindrically shaped plugs of the restorative composition of Example 7 being 1.2 cm. in length and 0.6 cm. in diameter were tested for compressive strength using a Universal testing machine at a crosshead speed of 0.05 in./min. (available from the Instron Corporation). The average compressive strength at fracture was 9200 p.s.i. with a 7% elongation.

EXAMPLE 9

Five human teeth were treated with $SnF_2$ as in Example 1 and coated with 2-(2,2,2-trifluoroethoxy)-ethyl 2-cyanoacrylate stabilized with 200 parts per million sulfur dioxide using a Kerr Cavitec ball applicator. After curing, the coated teeth were immersed in a solution of 0.2% aqueous methylene blue which solution was then cycled from 2° C. to 65° C. six times at five minutes per cycle. The solution was then maintained at 37° C. for 20 hours. The teeth were then removed and observed for marginal penetration of the dye. No penetration was observed.

EXAMPLE 10

$Ca(OH)_2$ cavity base preparations were coated onto a glass slide and subsequently treated with two coatings of cavity liner. The cavity liners employed were 2-(2,2,2-trifluoroethyl) 2-cyanoacrylate; 2-(1,1,1,3,3,3-hexafluoroisopropoxy)-ethyl 2-cyanoacrylate; "Saran"; "Copalite"; and "S. S. White" liners. Dye indicator solutions as indicated in the table below were prepared and one drop was placed on each cavity liner preparation. The preparations were then observed for penetration of the dye and the time (in minutes) required to notice a change in the dye indicator to its basic color was recorded.

| Liners | H₂O Phenol- phthalein | MMA methyl red | GMA phenol red | MAA phenol- phthalein | MAA phenol red |
|---|---|---|---|---|---|
| $CH_2{=}\overset{CN}{\underset{|}{C}}{-}CO_2{-}(CH_2)_2OCH_2CF_3$ | 30 | 1 | 2 | 9 | |
| $CH_2{=}\overset{CN}{\underset{|}{C}}{-}CO_2(CH_2)_2OCH(CF_3)_2$ | 30 | 2 | 4 | 6 | |
| "Saran" [1] | 0.1 | 0.1 | 0.15 | | 0.05 |
| "Copalite" [2] | 0.3 | 0.1 | 0.3 | | 0.05 |
| Cavity liner and varnish [3] | 0.2 | 0.5 | 1.5 | | 0.5 |

[1] "Saran" is identified in Example 2.
[2] "Copalite" is a trade name for a copal resin dissolved in chloroform; it is manufactured by Cooley and Cooley, Ltd., Houston, Texas and distributed by the William Getz Corp., Chicago, Illinois.
[3] A resinous commercial cavity liner material available from S. S. White Dental Mfg. Co., Philadelphia, Pa.

NOTE.—MMA=methyl methacrylate; GMA=glycidyl methacrylate; MAA=methacrylic acid.

What is claimed is:

1. In a process for treating a tooth, the step comprising applying an adhesive composition to a surface of said tooth comprising, as the major adhesive component, a compound of the structural formula

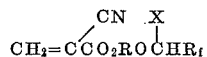

wherein R is a divalent aliphatic hydrocarbon radical having from 2 to 8 carbon atoms, $R_f$ is a fluoroaliphatic radical having from 1 to 8 carbon atoms, and X is H, RH, CH₃ or $R_f$ where R and $R_f$ are as defined hereinabove; and curing said composition thereon.

2. The process of claim 1 in which said tooth surface is enamel.

3. The process of claim 1 in which said tooth surface is dentin.

4. The process of claim 1 in which said tooth surface is the surface of a tooth cavity.

5. The process of claim 1 in which said R is an alkylene radical.

6. The process of claim 1 in which said $R_f$ is a fluoroalkyl radical.

7. The process of claim 6 in which said fluoroalkyl radical contains a terminal trifluoromethyl group.

8. The step of claim 1 wherein the major adhesive component is 2-(2,2,2-trifluoroethoxy)-ethyl 2-cyanoacrylate.

9. The step of claim 1 wherein the major adhesive component is 2-(1,1,1,3,3,3-hexafluoroisopropoxy)-ethyl 2-cyanoacrylate.

10. The step of claim 1 wherein the major adhesive component is 2-(1,1-dihydroperfluorobutoxy)-ethyl 2-cyanoacrylate.

References Cited

UNITED STATES PATENTS 2,784,215    3/1957    Joyner.

FOREIGN PATENTS 478,887    11/1951    Canada.

JOSEPH L. SCHOFER, Primary Examiner

C. A. HENDERSON, JR., Assistant Examiner

U.S. Cl. X.R.

106—35; 117—123; 260—41, 78.4, 465.4; 424—81